United States Patent [19]

Lin et al.

[11] Patent Number: 5,298,670
[45] Date of Patent: Mar. 29, 1994

[54] METHOD OF CONTROLLING MOLECULAR WEIGHT DISTRIBUTION OF POLYTETRAMETHYLENE ETHER GLYCOL

[75] Inventors: Wen-Fa Lin; Jun-Yi Chen, both of Hsinchu, Taiwan

[73] Assignee: Industrial Technology Research Institute, Taiwan

[21] Appl. No.: 42,411

[22] Filed: Apr. 2, 1993

[51] Int. Cl.$^5$ .................... C07C 41/34; C07C 41/38
[52] U.S. Cl. ................................ 568/617; 568/621
[58] Field of Search ............................. 568/617, 621

[56] References Cited

U.S. PATENT DOCUMENTS

| | | | |
|---|---|---|---|
| 4,306,058 | 12/1981 | Copelin | 528/498 |
| 4,500,705 | 2/1985 | Copelin | 528/417 |
| 4,762,951 | 8/1988 | Mueller . | |
| 4,933,503 | 6/1990 | Mueller . | |
| 5,053,553 | 10/1991 | Dorai et al. | 568/617 |

Primary Examiner—Howard T. Mars
Attorney, Agent, or Firm—Darby & Darby

[57] ABSTRACT

Polytetramethylene ether glycols (PTMEG) are fractionated with liquid propane in an extractor under high pressure. Fractions are separated by altering the extraction pressure, which alters the solvent power of the propane. The polydispersities of all extracted PTMEG fractions are generally below 1.3. The addition of a cosolvent, preferably tetrahydrofuran, can effectively lower the initial extraction pressure and increase the efficiency of the extraction.

19 Claims, 1 Drawing Sheet

METHOD OF CONTROLLING MOLECULAR WEIGHT DISTRIBUTION OF POLYTETRAMETHYLENE ETHER GLYCOL

BACKGROUND OF THE INVENTION

Polytetramethylene ether glycols (PTMEG) are primarily used as chain segments in polyurethanes and polyesters. The most important uses are in the polyurethane art, i.e., the production of spandex fiber, elastomers, and thermoplastics. PTMEG with molecular weights of 1000 and 2000 are commercially produced and utilized on a large scale. PTMEG with molecular weights of 650 and 2900 are manufactured only on a small scale, and other grades are sometimes produced as specialty products. The polydispersity, or index of molecular weight distribution, of all grades of crude PTMEG products is usually about 2.0, a level which is generally not suitable for industrial use. Further treatments are often used to narrow the molecular weight distribution of PTMEG before it is utilized.

The most commonly used commercial treatment to narrow the PTMEG molecular weight distribution is solution extraction. A number of solution extraction procedures have been previously proposed for obtaining PTMEG or other polymerizates as fractions with smaller polydispersities. U.S. Pat. No. 5,053,553, issued to Dorai, teaches the extraction of PTMEG with methanol, water, and a non-polar cosolvent, where the cosolvent has a solubility parameter between 7.30 and 8.20. Japanese Patent No. 60-42,421 (1985), assigned to Mitsubishi, teaches the separation using methanol and water. The mixed solvent and PTMEG is used at a weight ratio of greater than 1.2. Japanese Patent No. 60-108,424 (1985), also describes a separation technique utilizing methanol and/or ethanol and water.

German Patent No. 3,607,946 A1 (1987) teaches the solvent separation of polytetrahydrofuran (PTHF) and tetrahydrofuran/alkylene oxide copolymers using a 1–4 C alkanol, preferably methanol or ethanol, a 4–12 C hydrocarbon, preferably cyclohexane or methylcyclohexane, and water. German Patent No. 3,728,613 A1 (1989) discloses a similar method, but a 4–12 C aliphatic hydrocarbon, especially a 4–7 C linear aliphatic hydrocarbon, is substituted for the cyclic hydrocarbons of DE 3,607,946.

U.S. Pat. No. 4,500,705 (1985), issued to Coplein, teaches the reduction of the oligomeric cyclic ether content of tetrahydrofuran or related polymerizate by contacting the polymerizate with an aliphatic or cycloaliphatic hydrocarbon of 6-8 carbon atoms, and separating the two resulting phases. U.S. Pat. No. 4,500,705 (1985), also issued to Coplein, teaches the reduction of the oligomeric cyclic ether content of a tetrahydroran or related polymerizate by contacting the polymerizate with a gas in the supercritical state.

However, the above described solution extraction technology can only fractionate PTMEG or the related polymerizate into two, or at most, three fractions. The lowest obtainable polydispersity of these fractions is about 1.3. As a result, there are limits on the industrial use of PTMEG in polymer formation. In theory, more fractions and narrower molecular weight distributions could be achieved through application of this solution extraction technology. However, it is anticipated that the solvent recovery from each fraction would be difficult in practice, requiring large energy input. Therefore, there is a need for the development of an improved and industrially feasible method for producing fractions having polydispersities of less than about 1.3, preferably about 1.1.

A polymer consists of many similar macromolecules with different molecular weights. In any one solvent, these macromolecules have different solubilities. Fractions of the polymer with narrow molecular weight distribution can be obtained by extracting the polymer individually with multiple solvents chosen for their selective solvent power. Alternately, molecular weight fractions can be isolated using one solvent by differing the extraction conditions. It is this principle has been applied in developing the present invention. Liquid propane, which possesses different solvent powers at different operating conditions, is utilized for fractionating PTMEG.

SUMMARY OF THE INVENTION

In accordance with the present invention, the use of liquid propane as an extractive solvent to fractionate PTMEG has proven both feasible and beneficial. This method is superior to conventional separation technology as multiple fractions are easily obtainable, the polydispersity of each fraction can be narrowed to as low as 1.1, and removal of the solvent from the PTMEG fraction is simplified.

The present method can be performed in a batch or continuous manner. In the batch process, extractor pressure is initially maintained at a low level and is increased stepwise during the process; while the separator pressure is maintained at a relatively low level. In the continuous process, the extractor pressure is maintained at a relatively high level, with the pressure of the first separator maintained at a slightly lower level than the extractor pressure. The pressures of subsequent separators maintained at gradually decreasing levels. A cosolvent can be added to the liquid propane to increase the extraction efficiency.

DETAILED DESCRIPTION OF THE DRAWINGS

Figure 1:
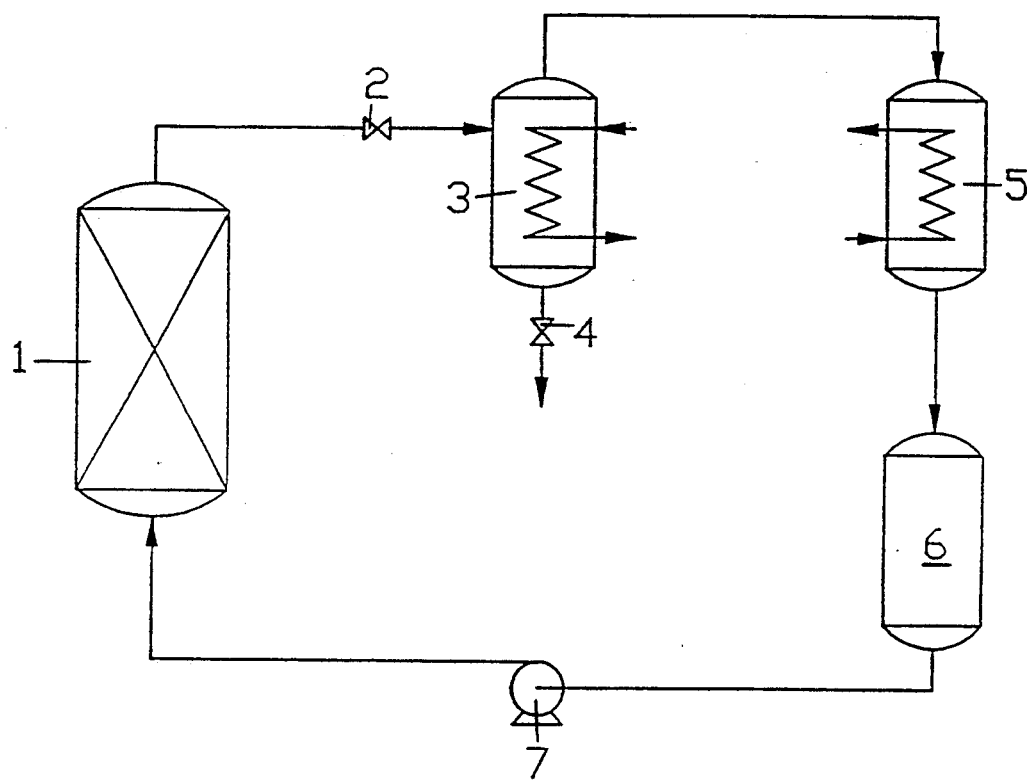

The batch process of the present invention is illustrated in FIG. 1.

Crude PTMEG having a broad molecular weight distribution is loaded into the extracting chamber 1 (extractor). Liquid propane is pumped into the chamber of PTMEG, extracting the fraction soluble under the extractor pressure conditions. The amount of propane used is that amount which is sufficient to dissolve the PTMEG fraction soluble under those conditions, generally about 500–5000 g. The exact amount necessary can be readily determined by one of ordinary skill. The propane phase, now containing a PTMEG fraction having a narrow molecular weight distribution, is separated from the residual PTMEG. This phase separation occurs because of the difference in density between the propane phase and the crude PTMEG. The stream of liquid propane containing the extracted PTMEG fraction passes through the heated expansion valve 2 and flows into the evaporating chamber 3 (separator). Heat is applied, boiling the liquid propane. The PTMEG fraction accumulates and is withdrawn through product valve 4, as it is predominantly non-volatile at the conditions in the evaporating chamber. Converted gaseous propane passes to the condensing chamber 5. Purified liquid propane passes to the accumulator 6, where it is recycled to the extracting chamber via the recycle pump 7. Extraction continues until PTMEG no longer flows from the extractor. When extraction of the soluble fraction is complete, the pressure is increased through regulation of the recycle pump and expansion valve, beginning extraction of the next fraction. This process can be repeated until all desired fractions have been removed from the crude PTMEG. If multiple fractions are removed, the remaining raffinate, collected from the bottom of the extractor, is another fraction of the polymer with low polydispersity.

The process of the present invention can also be performed continuously. In the continuous mode, an extractor and a plurality of separators are used. Liquid propane under the highest operating pressure is continuously pumped through the crude PTMEG, which is being fed continuously into the extractor. The stream of liquid propane and solutes pass through a series of separators, where the separator pressures are maintained at incrementally decreasing levels. Under the conditions of each separator, a particular molecular weight fraction of the PTMEG becomes insoluble and is separated from the solution. When all of the fraction insoluble at that separator pressure has been removed, the remaining propane phase is transferred to the next separator, which is maintained at a still lower pressure. In this way, multiple fractions of PTMEG, with different molecular weights and low polydispersities, can be obtained. The number of separators used is determined by the number of fractions desired. If a portion of the PTMEG is insoluble even at the highest pressure condition, the raffinate, collected from the bottom of the extractor, is another fraction of low polydispersity.

After removal of all the desired PTMEG fractions from the propane, the remaining solvent can be pumped in an evaporating chamber. Heat is applied, boiling the propane and removing any residual PTMEG. This is withdrawn from the evaporating chamber. The purified propane can then be recycled for use in the extractor.

Selection of appropriate pressure increments between batches, or between separators for the continuous method, is governed by the non-linear relationship between the solvent power of the liquid propane and the pressure applied. Without being bound by theory, the solubility of the lower molecular weight PTMEG is believed more sensitive to pressure differences than that of higher molecular weight PTMEG. Therefore, the pressure differences between batches should be relatively small when extracting low molecular weight fractions, that is, when using relatively lower pressures, and the differences should be relatively large when extracting high molecular weight fractions at relatively higher pressures.

The process of the present invention possesses a number of important advantages over the prior art. Many PTMEG fractions can be obtained by merely controlling the extracting pressure. These multiple fractions, having different molecular weights, can be utilized in various specific applications. Additionally, the polydispersity of each fraction can be narrowed to about 1.1. Further, the propane can be readily and completely separated from the extracted PTMEG, removing the need for the final distillation of prior art method.

Liquid propane for use in the present invention is preferably of industrial grade. The purity of the propane is about 97.2 mol % including impurities of ethane (about 1.5 mol %) and isobutane (about 1.3 mol %). The propane can be used directly in the process without pretreating.

PTMEG is susceptible to thermal degradation but does not deteriorate under the pressure. Therefore, the extractor is operated at a temperature of 40°-100° C., preferably 60°-80° C., and at a pressure of 200-5000 psia, preferably 400-3000 psia.

The efficiency and economy of the process can be enhanced by using a cosolvent, which functions in increasing the solubility of PTMEG in the liquid propane. The cosolvent can be any organic liquid having a boiling point of 40°-100° C., and which is miscible with the PTMEG. Useful cosolvents for use in the present method are tetrahydrofuran (THF), acetone, and methanol. The cosolvent is used at a concentration of approximately 1-5 wt % of the liquid propane. The cosolvent can be added directly into the stream of liquid propane by a syringe pump.

The polydispersities (d) of the PTMEG fractions produced using the present invention are determined using the following formula:

$$d = Mw/Mn$$

where Mw is the weight average molecular weight and Mn is the number average molecular weight. The fraction Mw and Mn are found using Gel Permeation Chromatography (GPC), following methods well known in the art.

The following examples more fully illustrate the present invention, but are not to be construed as limiting the scope thereof.

EXAMPLE 1

This example illustrates a batch operation. The extractor was loaded with 29.3 grams of PTMEG (Mn=1500, d=1.83). The temperature of extractor was maintained at 60° C. and the initial extracting pressure was set at 600 psia. The extractor pressure was sequentially increased to remove fractions soluble at 600, 800, 1000, 1200, and 1500 psia. At each pressure the soluble fraction was extracted with a selected amount of liquid propane. The amounts of solvent used and the results are shown in TABLE 1, where $W_i$ is weight percent, and $\Sigma W_i$ is accumulated weight percent.

TABLE 1

| Fraction | Pressure (psia) | Propane Used (g) | Mass Collected (g) | $W_i$ (%) | $\Sigma W_i$ (%) | Mn | Mw/Mn |
|---|---|---|---|---|---|---|---|
| 1 | 600 | 1080 | 1.142 | 3.90 | 3.90 | — | — |
| 2 | 800 | 1870 | 1.938 | 6.61 | 10.51 | 721 | 1.29 |
| 3 | 1000 | 1850 | 1.847 | 6.31 | 16.82 | 776 | 1.22 |
| 4 | 1200 | 1830 | 1.772 | 6.05 | 22.87 | 866 | 1.23 |
| 5 | 1500 | 1850 | 0.749 | 2.56 | 25.43 | 956 | 1.21 |
| Parent | | | 29.286 | 100.00 | | 1500 | 1.83 |
| Raffinate | | | 20.587 | 70.29 | | 1976 | 1.63 |

As evident from the polydispersity values (column Mw/Mn), fractions with narrow range molecular weights are obtained. These values are below the best prior art value of 1.3. Further, four fractions are isolated, whereas prior art processes could separate three fractions at most.

EXAMPLE 2

This example illustrates the use of a cosolvent. The extractor was loaded with 32.4 grams of PTMEG (Mn=1089, d=1.480). Approximately 2.1 wt % of the cosolvent THF was added to the stream of liquid propane before entering the extractor. The temperature of extractor was maintained at 60° C. and the initial extracting pressure was set at 400 psia. The extractor pressure was sequentially increased to remove fractions soluble at 600, 800, 1000, 1200, 1500, 2000, and 3000 psia. At each pressure the soluble fraction was extracted with a selected amount of the cosolvent. The amount of solvent used and the results are shown in TABLE 2.

TABLE 2

| Fraction | Pressure (psia) | Propane/ Cosolvent Used (g) | Mass Collected (g) | $W_i$ (%) | $\Sigma W_i$ (%) | Mn | Mw/Mn |
|---|---|---|---|---|---|---|---|
| 1 | 400 | 2000 | 2.273 | 7.01 | 7.01 | 564 | 1.35 |
| 2 | 600 | 1790 | 2.815 | 8.69 | 15.70 | 701 | 1.13 |
| 3 | 800 | 1930 | 3.127 | 9.65 | 25.35 | 771 | 1.13 |
| 4 | 1000 | 1650 | 2.631 | 8.12 | 33.47 | 847 | 1.12 |
| 5 | 1200 | 2930 | 3.612 | 11.15 | 44.62 | 945 | 1.18 |
| 6 | 1500 | 1960 | 2.503 | 7.72 | 52.34 | 1093 | 1.22 |
| 7 | 2000 | 1890 | 2.283 | 7.05 | 59.39 | 1196 | 1.25 |
| 8 | 3000 | 1870 | 3.622 | 11.18 | 70.57 | 1397 | 1.31 |
| Parent | | | 32.403 | 100.00 | | 1089 | 1.48 |
| Raffinate | | | 11.117 | 34.31 | | 2063 | 1.38 |

This example illustrates the advantage in using a cosolvent. The polydispersities of the fractions are generally reduced well below the prior art value of 1.3. Fractions 2-5 approach the target value of 1.1. Further, eight fractions having narrow-range molecular weights are isolated, which is clearly superior to the prior art isolation of only up to three fractions.

EXAMPLE 3

This example illustrates a continuous operation. The operating temperatures of extractor and separators are set at 60° C. with the other operating conditions as shown in Table 3. The extractor is operated in a countercurrent mode, with the crude PTMEG pumped in at the top of the extractor and the liquid propane/cosolvent mixture entering at the bottom. The propane phase exiting the extractor contains the PTMEG fractions soluble under the extractor conditions.

In this example, eight fractions are desired, so eight separators are used. The pressure of the first separator is maintained at a level below that of the extractor, such that the highest-molecular-weight PTMEG fraction which was dissolved in the liquid propane precipitates and is removed from the separator. The remaining stream is pumped into successive separators, each maintained at successively lower pressures, effectively fractionating the PTMEG into narrow molecular weight distributors. Following the lowest pressure separator, the almost solute-free propane is recompressed and recycled.

TABLE 3

| Extractor | 3,000 psia |
|---|---|
| Crude PTMEG | 50 g/hr |
| Liquid propane with 2% THF | 10 kg/hr |
| Separator 1 | 2,000 psia |
| Separator 2 | 1,500 psia |
| Separator 3 | 1,200 psia |

TABLE 3-continued

| Separator 4 | 1,000 psia |
|---|---|
| Separator 5 | 800 psia |
| Separator 6 | 600 psia |
| Separator 7 | 400 psia |
| Separator 8 | 200 psia |

What is claimed is:

1. A method for fractionating polytetramethylene ether glycols (PTMEG) which comprises:
   a) contacting a feed PTMEG having a broad molecular weight distribution with a solvent comprising liquid propane in an extraction zone at a first comparatively low pressure to form a first mixture;
   b) separating from said first mixture a propane phase containing a low molecular weight fraction of said PTMEG having a narrow molecular weight distribution phase and a residual PTMEG phase;
   c) recovering said low molecular weight fraction from said propane phase;
   d) contacting the residual PTMEG with additional liquid propane in said extraction zone at an increased pressure so as to form a second mixture;
   e) separating from said second mixture a propane phase containing the next lowest molecular weight fraction and residual PTMEG;
   f) recovering the next lowest molecular weight fraction from the propane phase formed in step (e); and
   g) repeating steps (d) through (f) until the desired number of fractions of PTMEG are obtained.

2. A continuous process for the fractionation of PTMEG wherein the PTMEG fractions are each separated from a solution of liquid propane by a series of pressure reduction steps which comprises:
   a) maintaining conditions of temperature, pressure and solvent concentration in an extraction zone sufficient to dissolve a PTMEG having a broad molecular weight range in a solvent comprising liquid propane to form a solution;
   b) removing the solution from the extraction zone and reducing the pressure thereon in a series of steps so as to cause the higher molecular weight PTMEG to come out of said solution; and
   c) after each pressure reduction step, separating from said solution the undissolved PTMEG.

3. The method of claim 1 in which a PTMEG fraction produced has a polydispersity of less than about 1.3.

4. The method of claim 1 in which the purity of liquid propane is from about 90% to 100%.

5. The method of claim in which the average molecular weight of the PTMEG starting product is from 500 to 4000.

6. The method of claim 1 in which the extractor temperature is from 40° to 100° C.

7. The method of claim 1 in which the extractor pressure ranges from about 200 to about 5000 psia during the course of the extraction.

8. The method of claim 1 in which the liquid propane contains an organic cosolvent.

9. The method of claim 8 in which the cosolvent is tetrahydrofuran.

10. The method of claim 1 in which the number of PTMEG fractions isolated is greater than 3.

11. The method of claim 2 in which a PTMEG fraction produced has a polydispersity of less than about 1.3.

12. The method of claim 2 in which the purity of liquid propane is from about 90% to 100%.

13. The method of claim 2 in which the average molecular weight of the PTMEG starting product is from about 500 to about 4000.

14. The method of claim 2 in which the extractor temperature is from about 40° to about 100° C.

15. The method of claim 2 in which the extractor pressure is from about 200 to about 5000 psia.

16. The method of claim 2 in which the separator pressures are from about 200 to about 5000 psia.

17. The method of claim 2 in which the liquid propane contains an organic cosolvent.

18. The method of claim 17 in which the cosolvent is tetrahydrofuran.

19. The method of claim 2 in which the number of PTMEG fractions isolated is greater than 3.

* * * * *